United States Patent
Soerensen

(10) Patent No.: US 12,247,368 B2
(45) Date of Patent: Mar. 11, 2025

(54) CAGE FOR A MONOPILE OF AN OFFSHORE WIND TURBINE, TOWER FOR AN OFFSHORE WIND TURBINE, OFFSHORE WIND TURBINE AND METHOD FOR INSTALLING A TOWER OF AN OFFSHORE WIND TURBINE

(71) Applicant: Siemens Gamesa Renewable Energy A/S, Brande (DK)

(72) Inventor: Johnny Soerensen, Videbaek (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 133 days.

(21) Appl. No.: 17/982,647

(22) Filed: Nov. 8, 2022

(65) Prior Publication Data
US 2023/0160170 A1 May 25, 2023

(30) Foreign Application Priority Data
Nov. 23, 2021 (EP) ..................................... 21210049

(51) Int. Cl.
*E02D 27/42* (2006.01)
*F03D 13/20* (2016.01)

(52) U.S. Cl.
CPC ........... *E02D 27/425* (2013.01); *F03D 13/22* (2016.05)

(58) Field of Classification Search
CPC ........ E02D 27/42; E02D 27/425; F03D 13/22
See application file for complete search history.

(56) References Cited

U.S. PATENT DOCUMENTS 552,268 A * 12/1895 Wood ..................... E04B 1/22
                                                                      52/223.5
1,868,494 A * 7/1932 Collins ................... E02D 27/52
                                                                       405/227

(Continued)

FOREIGN PATENT DOCUMENTS

EP         3255210 A2     12/2017
EP         3483342 A1      5/2019

(Continued)

OTHER PUBLICATIONS

Beyer, Manfred et al: "New BAUER Flydrill system drilling monopiles at Barrow Offshore Wind Farm, UK"; BAUER Maschinen GmbH, D-865292 Schrobenhausen, Germany; Oct. 21, 2011 (Oct. 21, 2011), XP055142024; Retrieved from the Internet: URL:http://wind.nrel.gov/public/SeaCon/Proceedings/Copenhagen.Offshore.Wind.2005/documents/papers/Installation_Concepts_and_risks/W.Brunner_New_BAUER_Flydrill_systemdrillingmonopiles.pdf;.

(Continued)

*Primary Examiner* — Benjamin F Fiorello
(74) *Attorney, Agent, or Firm* — Schmeiser, Olsen & Watts LLP

(57) ABSTRACT

A cage for a monopile of an offshore wind turbine is provided, configured to extend, in an installed state, in a height direction of the monopile, wherein the cage includes one or more supports for holding one or more pipes and/or tubes, and a first inner diameter at a lower portion thereof and a second inner diameter at an upper portion thereof, the second inner diameter) being smaller than the first inner diameter, and wherein the cage is configured to be arranged on the monopile having a conically shaped outer surface tapered in the height direction such that the upper portion of the cage rests at the conically shaped outer surface of the (Continued)

monopile. The cage can be attached by resting it on the conically shaped outer surface of the monopile.

20 Claims, 5 Drawing Sheets

(56) References Cited

U.S. PATENT DOCUMENTS

| | | | | |
|---|---|---|---|---|
| 3,295,817 | A * | 1/1967 | Carlsen | E02D 27/42 |
| | | | | 52/649.7 |
| 7,471,010 | B1 | 12/2008 | Fingersh | |
| 7,982,330 | B1 * | 7/2011 | Ueno | F03D 13/20 |
| | | | | 290/55 |
| 2006/0062676 | A1 * | 3/2006 | Jakubowski | B63B 35/44 |
| | | | | 416/244 R |
| 2008/0028715 | A1 * | 2/2008 | Foss | E02B 17/0004 |
| | | | | 52/651.01 |
| 2010/0230965 | A1 * | 9/2010 | Pitre | F03D 9/25 |
| | | | | 290/55 |
| 2010/0313417 | A1 * | 12/2010 | Lebon | F03D 13/10 |
| | | | | 269/287 |
| 2011/0056151 | A1 * | 3/2011 | Marmo | E02D 27/42 |
| | | | | 52/651.01 |
| 2011/0135400 | A1 * | 6/2011 | Hall | E02D 27/52 |
| | | | | 405/195.1 |
| 2014/0015255 | A1 * | 1/2014 | Schellstede | F03D 13/25 |
| | | | | 290/55 |
| 2014/0144006 | A1 * | 5/2014 | Ashouri | E06C 7/185 |
| | | | | 29/525.08 |
| 2014/0345510 | A1 * | 11/2014 | Li | F03D 13/20 |
| | | | | 114/126 |

FOREIGN PATENT DOCUMENTS

| | | |
|---|---|---|
| EP | 3594411 A2 | 1/2020 |
| WO | WO 2020095012 A1 | 5/2020 |
| WO | WO 2020239427 A1 | 12/2020 |

OTHER PUBLICATIONS

European Search Report issued on May 18, 2022 for application No. 21210049.9.

* cited by examiner

CAGE FOR A MONOPILE OF AN OFFSHORE WIND TURBINE, TOWER FOR AN OFFSHORE WIND TURBINE, OFFSHORE WIND TURBINE AND METHOD FOR INSTALLING A TOWER OF AN OFFSHORE WIND TURBINE

CROSS-REFERENCE TO RELATED APPLICATIONS

This application claims priority to EP Application No. 21210049.9, having a filing date of Nov. 23, 2021, the entire contents of which are hereby incorporated by reference.

FIELD OF TECHNOLOGY

The following relates to a cage for a monopile of an offshore wind turbine, a tower for an offshore wind turbine with such a cage, an offshore wind turbine with such a tower and a method for installing a tower of an offshore wind turbine.

BACKGROUND

The energy produced by an offshore wind turbine is usually transmitted as electrical energy to another offshore or an onshore installation and finally to an onshore utility grid. For the power transmission of electrical energy, for example high voltage AC cables are used transmitting up to 400 kV. Such electrical cables and their installation are, however, very expensive. Further, offshore wind turbines, in particular of modern wind farms, can be situated quite far from the coast, e.g., with a distance to the coast of 5 km or more. Thus, the energy produced by the wind turbines needs to be transmitted over long distances.

An alternative and less expensive way of transporting the energy produced by a wind turbine is converting the electrical energy into a gas, e.g., hydrogen gas, and transporting the gas in pipes to another offshore or onshore installation. The advantage is not only an easier transportation of the produced energy but also that the gas can be directly consumed, for example as fuel in automobiles. For example, a gas producing facility, e.g., an electrolysis equipment generating hydrogen gas from water, is placed at or near the wind turbine to convert the electrical energy into a gas. The produced gas is transported from the gas producing facility at the wind turbine by gas pipes to another offshore or onshore installation and finally to an onshore site. Onshore, the gas can be consumed directly, for example as a fuel in automobiles, or can be converted again into electrical energy in a hydrogen fuel cell to produce again electrical energy for feeding it into a utility grid.

SUMMARY

An aspect relates to an improved tower for an offshore wind turbine and an improved method for installing a tower of an offshore wind turbine.

Accordingly, a cage for a monopile of an offshore wind turbine is provided. The cage is configured to extend, in an installed state, in a height direction of the monopile. The cage comprises one or more supports for holding one or more pipes and/or tubes. The cage further comprises a first inner diameter at a lower portion thereof and a second inner diameter at an upper portion thereof, the second inner diameter being smaller than the first inner diameter. Furthermore, the cage is configured to be arranged on the monopile having a conically shaped outer surface tapered in the height direction such that the upper portion of the cage rests at the conically shaped outer surface of the monopile.

By using the cage comprising the one or more supports for holding one or more pipes and/or tubes, pipes and/or tubes can be easier installed and better attached at the monopile. Further, due to the cage being configured to extend, in the installed state, in the height direction of the monopile, the pipes and/or tubes can be guided alongside the monopile, for example from a platform/device of the wind turbine to the seabed.

The cage having a smaller inner diameter at an upper portion thereof can be attached to the monopile solely by resting on the conically shaped outer surface of the monopile. In particular, the cage can be lowered from above on the monopile until it gets stuck when the upper portion of the cage with the smaller inner diameter engages the conically shaped outer surface of the monopile. Further, an attachment of the cage to the monopile can be ensured, for example solely, by the weight of the cage. Therefore, attaching the cage to the monopile does not require welding, screwing or another mechanism altering the structure of the monopile. Hence, installing the cage at the erected monopile is easy. Furthermore, a welding process which can weaken the structure of the monopile and, thus, the foundation of the wind turbine is avoided.

Further, the proposed cage can be installed on the monopile after piling the monopile into the seabed. Therefore, damaging the cage during the piling of the monopile into the seabed is avoided.

The cage is, for example, a rack. The cage is, for example, made from a material comprising metal. The cage comprises, for example, several rods. Some or all of the rods may, for example, extend in the height direction of the monopile. The cage comprises, for example, one or more rings (annular elements). The one or more rings may, for example, be connected with each other via the one or more of the rods. The upper portion of the cage comprising the second (smaller) inner diameter may, for example, be and/or include one of the rings. The lower portion of the cage comprising the first (larger) inner diameter may, for example, include another one of the rings.

The conically shaped outer surface of the monopile is, in particular, tapered in the height direction from a first outer diameter to a second outer diameter. The first inner diameter of the cage is, in particular, larger than the first outer diameter of the monopile. Further, the second inner diameter of the cage is, in particular, smaller than the first outer diameter of the monopile and larger than the second outer diameter of the monopile.

The height direction of the monopile is, in particular a height direction of the monopile and the wind turbine in the erected state. The upper portion of the cage is, in particular, an upper portion with respect to the height direction. Further, the lower portion of the cage is, in particular, a lower portion with respect to the height direction.

The one or more pipes include, for example, pipes for transporting energy, e.g., energy produced by the wind turbine. The one or more pipes include, for example, pipes for transporting gas and/or electrical energy. The one or more pipes may also include, for example, pipes for transporting data and/or signals to or from one or more devices of the wind turbine to or from another offshore and/or onshore installation. Further, the one or more pipes may also include, for example, pipes for transporting water, e.g., seawater, to one or more devices of the wind turbine. The water may be used, for example, for cooling and/or electrolysis processes.

Pipes for transporting gas are, in particular, gas-tight pipes. The one or more pipes include, for example, pipes made from metal, steel and/or a material comprising metal and/or steel. The material of the pipes may, in particular, be a gas-tight and/or durable material.

The wind turbine is an apparatus to convert the wind's kinetic energy into electrical energy. The wind turbine comprises, for example, a rotor having one or more blades connected each to a hub, a nacelle including a generator, and a tower holding, at its top end, the nacelle. The tower of the wind turbine comprises, in particular, the monopile as a foundation. The monopile is, in particular, driven, e.g., piled or drilled, into a seabed or a ground of a lake or another open water. The tower of the wind turbine comprises, furthermore, a main portion. The main portion is connected at its bottom end to the monopile and is holding at its top end the nacelle.

The wind turbine is, for example, an offshore wind turbine. Offshore does not only include marine environments but also lakes and other open waters.

According to an embodiment, the cage comprises one or more tubes connected to the one or more supports and extending in the height direction, the one or more tubes being configured for accommodating one or more pipes.

The one or more tubes are, in particular, hollow tubes. Each of the one or more tubes has, in particular, a first opening at a bottom end thereof and a second opening at a top end thereof, the first and second openings being openings of an interior channel of a respective tube.

The one or more tubes are, for example, configured to accommodate pipes and/or cables and, thereby, guide and protect them. The one or more tubes are, for example, configured to accommodate energy transport pipes/cables, gas pipes, electrical cables, optical cables (e.g., optical fiber cables), data cables, communication cables and/or water pipes. The tubes can be used as guiding means when installing the pipes and/or cables. For example, the pipes and/or cables can be pushed or pulled through the tubes.

The guiding function of the tubes is of particular advantage in the case of gas pipes which are made of a stiffer material compared to electrical cables to ensure gas-tightness. Gas-tight pipes comprise, for example, metal and/or steel. Due to the stiffer material, gas pipes are more difficult to bend into the required curvature. Hence, by pushing or pulling the gas pipes through the tubes, an installation of the gas pipes can be easier performed.

According to a further embodiment, the one or more tubes are J-shaped tubes, comprise a bell-shaped mouth at a lower end thereof, comprise inside a pre-installed messenger wire and/or comprise a float seal sealing an opening of the respective tube at a lower end thereof.

A J-tube comprises, in particular, a first portion extending in the height direction of the monopile, and a second portion continuously connected to the first portion. The second portion is bent (e.g., in a smooth curve) relative to the first portion to form the J-shape. A bending angle of the J-tube may have, for example, a value in the range of 15 to 75 degree, 25 to 65 degree and/or 35 to 55 degree and/or have a value of 45 degree. A bending angle of the J-tube is, in particular, an angle by which the second portion is bent from the height direction.

One, some or all of the tubes may have a bell-shaped mouth at a lower end thereof. That means, the first opening of the respective tube may have the bell-shaped mouth. Thus, the first opening is, in particular, larger than a diameter and/or cross-section of the respective tube. Due to the bell-shaped mouth, insertion of a pipe, for example of a relatively stiff pipe, into the tube is simplified.

The messenger wire is, in particular, a pulling rope. The messenger wire includes, for example, a pulling head. The messenger wire can be used to pull an end of a pipe into and through the tube.

The float seal of a respective tube is, for example, connected with the messenger wire of this tube. The float seal is used for sealing the opening of the respective tube at the lower end thereof during installation of the tube at the cage and/or during installation of the cage with the tube at the monopile. After inserting a respective pipe through the respective tube, the float seal is floating to the water line and can be easily collected.

According to a further embodiment, the one or more supports each include a loop for guiding one or pipes through the respective loop.

By providing the cage with one or more supports each having a loop, the pipes can be attached to the monopile by inserting them through the one or more loops. Thus, installation of pipes at the monopile is simplified, in particular when this installation step is carried out partly below the water level (sea level).

The loop is, for example, a closed loop. The loop is, for example, integrally formed with the respective support.

According to a further embodiment, the cage comprises one or more flexible elements configured for being arranged between the conically shaped outer surface of the monopile and an inner surface of the upper portion of the cage.

Thus, a direct contact between the cage and the outer surface of the monopile is avoided. Hence, scratching of the cage at the outer surface of the monopile can be avoided. This is the case even when slight movements of the monopile occur during installation of the main portion of the tower and during operation of the wind turbine under the influence of wind on the rotor or directly on the monopile due to water current and waves. In particular, a direct contact between the cage and the monopile is avoided in the region where the upper portion of the cage is resting on the outer surface of the monopile.

For example, the upper portion of the cage comprising the second inner diameter rests via the flexible elements at the conically shaped outer surface of the monopile.

The flexible elements are, for example, elastic elements capable to deform under the influence of an external force.

According to a further embodiment, the one or more flexible elements comprise rubber, neoprene, nylon, polymer, a fabric, a mat and/or a non-corrosive material.

The flexible elements comprising a non-corrosive material helps preventing corrosion of the cage and/or the monopile.

According to a further embodiment, the cage comprises in a top portion thereof a landing stage for a vessel.

Thus, a landing stage (platform) can be easier installed.

The top portion of the cage is a top portion with respect to the height direction of the monopile. The top portion of the cage is, for example, arranged above the upper portion of the cage comprising the second inner diameter.

According to a further embodiment, the cage comprises at least two tubes separated from each other by a predetermined angle as seen in the height direction.

The predetermined angle is, for example, an angle of 90 degrees or an angle of 180 degrees. However, the angle may also have a different value than 90 or 180 degrees.

Having the tubes positioned in a standard angle, the cage can be advantageously positioned such that a route between the tubes of the cage and tubes of a cage of a neighboring wind turbine is short.

According to a further embodiment, the cage comprises several rods extending in the height direction and one or more rings connected with each other via the rods, wherein the one or more rings are releasably closed rings.

Each of the one or more rings comprises, for example, at least two ring elements (e.g., two half ring elements) releasably connected to each other, e.g., bolted to each other.

Thus, the cage can be easily replaced by a new cage. The new cage can be assembled and lowered to lock its position. In embodiments, the one or more rings may also be inextricable closed rings.

According to a further aspect, a cage for a transition piece of an offshore wind turbine is provided. The cage is configured to extend, in an installed state, in a height direction of the transition piece. Further, the cage comprises one or more supports for holding one or more pipes and/or tubes, and a first inner diameter at a lower portion thereof and a second inner diameter at an upper portion thereof, the second inner diameter being smaller than the first inner diameter. Furthermore, the cage is configured to be arranged on the transition piece having a conically shaped outer surface tapered in the height direction such that the upper portion of the cage rests at the conically shaped outer surface of the transition piece.

The transition piece may be installed on a monopile driven into the seabed or on a floating foundation.

According to a further aspect, a tower for an offshore wind turbine is provided. The tower comprises a monopile or a transition piece with a conically shaped outer surface and a cage as described above. Further, the cage is arranged on the monopile or the transition piece such that the upper portion of the cage rests at the conically shaped outer surface of the monopile or the transition piece.

According to an embodiment of the further aspect, the conically shaped outer surface is tapered in the height direction from a first outer diameter to a second outer diameter of the monopile or the transition piece. Further, the first inner diameter of the cage is larger than the first outer diameter. Furthermore, the second inner diameter of the cage is smaller than the first outer diameter and larger than the second outer diameter.

In particular, the monopile comprises at least one conically shaped section tapered in the height direction from the first outer diameter to the second outer diameter.

According to a further embodiment of the further aspect, the tower comprises a gas producing facility and one or more pipes fluidly connected with a gas producing unit of the gas producing facility, wherein the one or more pipes are configured for transporting a gas produced in the gas producing unit to another offshore and/or onshore installation, and the one or more pipes are attached by the supports to the cage or the one or more pipes are guided through one or more tubes of the cage.

The one or more pipes are, for example, gas pipes (e.g., gas-tight pipes).

The one or more tubes penetrate, for example, a platform of the gas producing facility.

The gas producing facility comprises the gas producing unit, the gas producing unit producing gas, for example, by electrolysis. The gas producing unit converts, for example, water (e.g., seawater) into hydrogen gas by using the electrical current produced by the generator of the wind turbine. Thereby, water is separated into hydrogen and oxygen by an electrolysis process in the gas producing unit.

According to a further aspect, an offshore wind turbine with an above-described tower is provided.

According to a further aspect, a method for installing a tower of an offshore wind turbine is provided. The tower comprises a monopile or transition piece and a cage. The monopile or transition piece has a conically shaped outer surface tapered in a height direction of the monopile or transition piece in the erected state. The cage extends in the height direction and comprises one or more supports for holding one or more pipes and/or tubes. The cage further comprises a first inner diameter at a lower portion thereof and a second inner diameter at an upper portion thereof, the second inner diameter being smaller than the first inner diameter. The method comprises the steps of:

lowering the cage onto the erected monopile or transition piece, and arranging the cage on the monopile or transition piece such that the upper portion of the cage rests at the conically shaped outer surface of the monopile or transition piece.

The method may further comprise the step of arranging the monopile in a seabed or ground of a lake or another open water such that the monopile is extending in a height direction.

The method may further comprise the step of installing one or more pipes at the cage. The one or more pipes are, for example, either directly attached at the cage or inserted into tubes of the cage.

The embodiments and features described with reference to the cage of the present invention apply mutatis mutandis to the tower, the offshore wind turbine and the method of the present invention and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of the invention.

BRIEF DESCRIPTION

Some of the embodiments will be described in detail, with reference to the following figures, wherein like designations denote like members, wherein.

DETAILED DESCRIPTION

Figure 1:
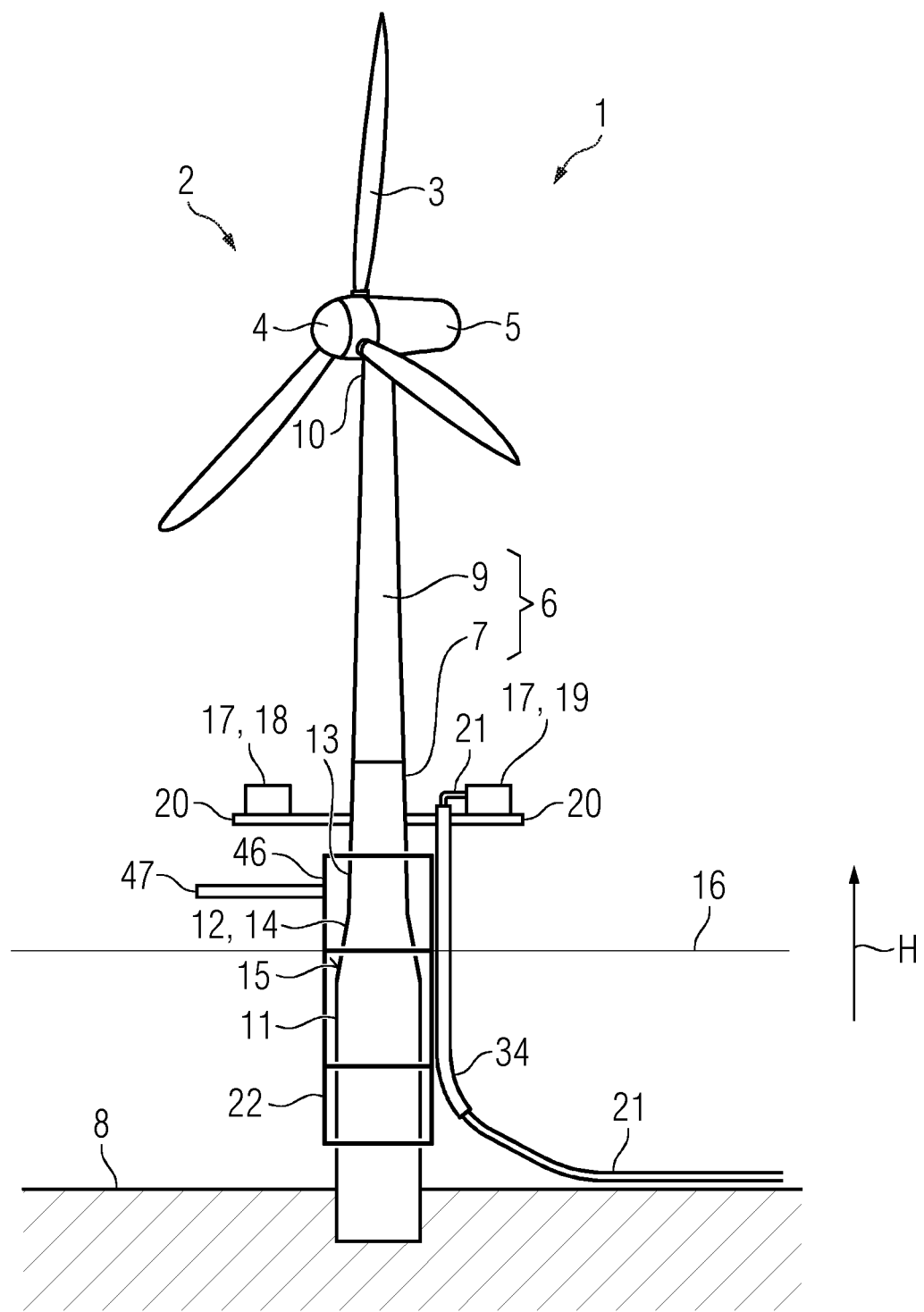
FIG. 1 shows a wind turbine according to an embodiment.

FIG. 1 shows an offshore wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 comprises a monopile 7 as a foundation, the monopile 7 being driven into the seabed 8. The tower 6 of the wind turbine 1 further comprises a main portion 9. The main portion 9 is erected on the monopile 7 and is holding at its top end 10 the nacelle 5. The wind turbine 1, its tower 6 and its monopile 7 are extending, in the erected state, in a height direction H.

Figure 2:
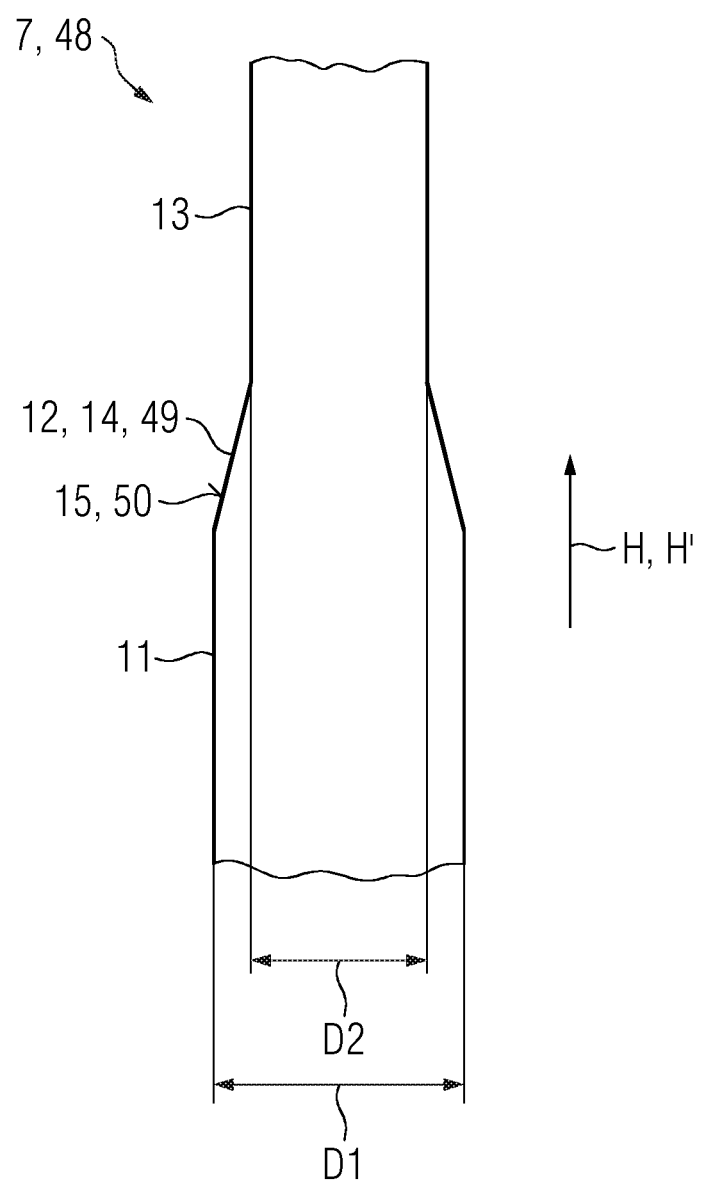
FIG. 2 shows a partial view of a monopile of the wind turbine of FIG. 1.

The monopile 7 comprises, for example, several lengthwise sections 11, 12, 13 continuously connected with each other. FIG. 2 shows an enlarged partial view of the monopile 7 and its lengthwise sections 11, 12, 13. At least one of the several lengthwise sections 11, 12, 13 (section 12 in FIG. 1) has a conical shape 14 with a conically shaped outer surface 15. In the example of FIG. 2, the other sections 11, 13 are cylindrically shaped. However, in other examples, one, some or all of the other sections 11, 13 may also be conically shaped such that they are tapered in the height direction H.

The reference sign 16 in FIG. 1 denotes a water line (i.e., sea level). The monopile 7 is partly arranged above the sea level 16.

The wind turbine 1 further comprises a gas producing facility 17. In the shown example of FIG. 1, the gas producing facility 17 comprises several units 18, 19 arranged on one or more gas producing platforms 20 of the wind turbine 1. The electrical energy generated by the generator in the nacelle 5 of the wind turbine 1 is converted into a gas, e.g., a hydrogen gas, by the gas producing facility 17. The gas producing facility 17 comprises a gas producing unit 19 converting, for example, water (e.g., sea water) by electrolysis into hydrogen gas. The produced (hydrogen) gas is transported by one or more pipes 21 from the wind turbine 1 to another offshore or onshore installation (not shown). The one or more pipes 21 are fluidly connected with the gas producing unit 19. The other offshore or onshore installation (not shown) is, for example, another offshore wind turbine and/or an offshore or onshore collector station.

The wind turbine 1 further comprises a cage 22 arranged on the monopile 7. The cage 22 is configured for easily attaching the one or more gas transporting pipes 21 to the monopile 7 and guiding the pipes 21 from the gas producing unit 19 to or close to the seabed 8. In FIG. 1, the shown pipe 21 is laid on the seabed 8. In other examples, the pipe 21 may also be buried in the seabed 8 and only emerge again at another offshore installation or close to the shoreline.

As shown in FIG. 2, the first lengthwise section 11 of the monopile 7 has a cylindrical shape with a first outer diameter D1. The second lengthwise section 12 is conically-shaped (conical shape 14) and is tapered in the height direction H from the first outer diameter D1 to a second outer diameter D2 to form the conically shaped outer surface 15. That means, the second outer diameter D2 is smaller than the first outer diameter D1. Further, the third lengthwise section 13 of the monopile 7 has a cylindrical shape with the second outer diameter D1.

The cage 22 being arranged on the monopile 7 (FIG. 1) is in particular arranged around the conically shaped section 12 of the monopile 7. Further, the cage 22 is resting on the conically shaped section 12.

Furthermore, the cage 22 in the example of FIG. 1 is arranged partly above the sea level 16.

Figure 3:
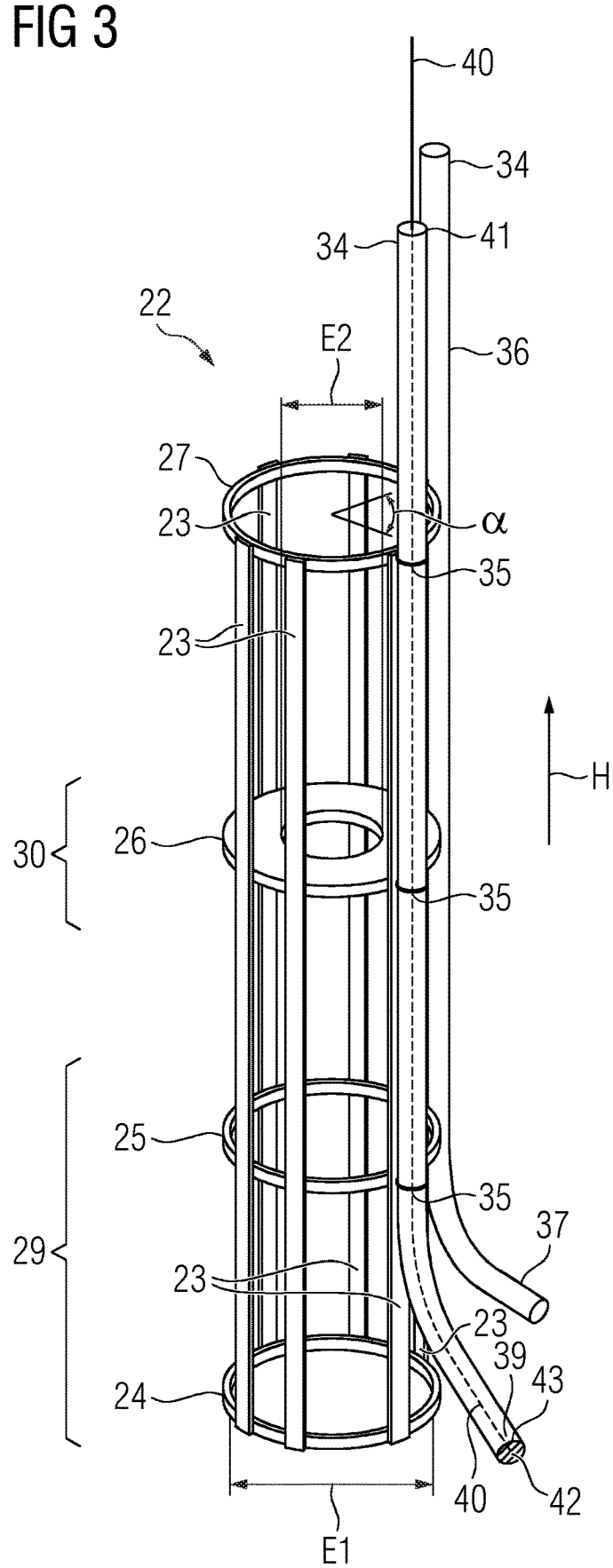
FIG. 3 shows a cage of the wind turbine of FIG. 1, the cage comprising J-shaped tubes.

As best visible in FIG. 3, the cage 22 comprises, for example, several rods 23 extending, in the installed state of the cage 22 on the monopile 7, parallel to the height direction H. The cage 22 shown in FIG. 3 comprises six rods 23 extending parallel to the height direction H. However, in other examples, the cage 22 may also comprise another number of rods 23, another arrangement of the rods 23 and/or another shape of the rods 23.

Figure 4:
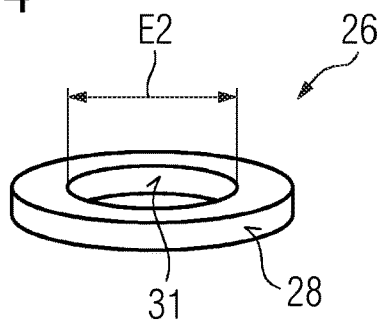
FIG. 4 shows a ring of the cage of FIG. 3.

Furthermore, the cage 22 shown in FIG. 3 comprises several rings (annular elements) 24, 25, 26, 27. Each ring 24, 25, 26, 27 is connected and fixed to each of the six rods 23. In particular, the rods 23 are fixed to an outer surface of each ring 24, 25, 26, 27 (e.g., the outer surface 28 of the ring 26, FIG. 4).

As shown in FIG. 3, the cage 22 comprises a first inner diameter E1 at a lower portion 29 (e.g., at the rings 24 and 25) of the cage 22. Further, the cage 22 comprises a second inner diameter E2 at an upper portion 30 (e.g., the ring 26, see also FIG. 4) of the cage 22. The second inner diameter E2 is smaller than the first inner diameter E1 of the cage 22.

Furthermore, the first inner diameter E1 of the cage 22 is larger than the first outer diameter D1 of the monopile 7. In addition, the second inner diameter E2 of the cage 22 is smaller than the first outer diameter D1 of the monopile 7 and larger than the second outer diameter D2 of the monopile.

Therefore, when the cage 22 is arranged on the monopile 7 by lowering it from above onto the monopile 7, the first section 11 of the monopile 7 is inserted into the lower portion 29 of the cage 22. In other words, the lower portion 29 of the cage 22 is arranged on the first section 11 of the monopile 7 such that it surrounds the first section 11. Furthermore, the cage 22 is further lowered until the upper portion 30 (e.g., the ring 26) of the cage 22 having the smaller second inner diameter E2 rests at the conically shaped outer surface 15 of the second section 12 of the monopile 7. In particular, an inner surface 31 (FIG. 4) of the upper portion 30 (e.g., the ring 26) is in contact and rests at the outer surface 15 of the conically shaped section 12 of the monopile 7.

In the example of FIGS. 1 and 3, the rods 23 of the cage 22 are arranged parallel to the height direction H. Further, the smaller second inner diameter E2 of the cage 22 is realized by configuring the ring 26 in the upper portion 30 of the cage 22 with a smaller diameter E2 than the rings 24, 25 in the lower portion 29 of the cage 22.

Figure 5:
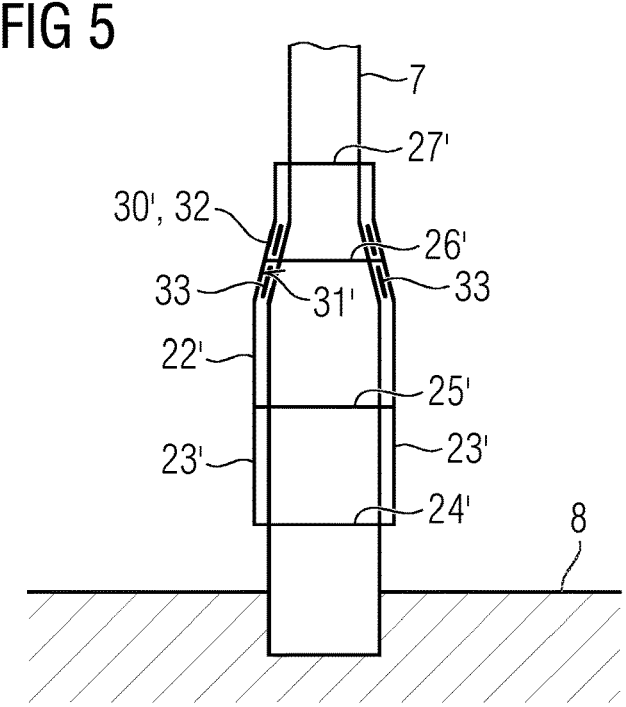
FIG. 5 shows a cage according to a further embodiment, the cage being arranged on the monopile of the wind turbine of FIG. 1.

In other examples, as illustrated in FIG. 5, rods 23' of a cage 22' may also have a configuration such that they are inclined with respect to each other in an upper portion 30'. In particular, the cage 22' shown in FIG. 5 has a section 32 tapered in the height direction H.

The cage 22 is configured for simplifying attachment of the one or more gas transporting pipes 21 to the monopile 7 and guiding the pipes 21 from the gas producing unit 19 to or close to the seabed 8.

The cage 22, 22' (FIGS. 3, 5) may comprise one or more flexible elements 33, as shown exemplarily in FIG. 5. The one or more flexible elements 33 are arranged between the conically shaped outer surface 15 (FIG. 2) of the monopile 7 and the inner surface 31' of the upper portion 30' of the cage 22'. Due to the flexible elements 33, scratching of the cage 22, 22' (i.e., its inner surface 31, 31') at the monopile 7 (i.e., its outer surface 15) is avoided. The one or more flexible elements 33 comprise, for example, one or more mats. Furthermore, a material of the flexible elements 33 may comprise, for example, rubber, neoprene and/or another flexible and non-corrosive material. By using a non-corrosive material for the flexible elements 33, corrosion of the cage 22, 22' and/or monopile 7 is avoided.

The purpose of the cage 22, 22' is to provide an improved attachment means for pipes of the wind turbine 1 such as the pipe 21 shown in FIG. 1. In the embodiment shown in FIGS. 1 and 3, the cage 22 comprises one or more tubes 34 connected and fixed to supports 35 of the cage 22. The tubes 34 may be pre-installed at the cage 22 such that during installation, the cage 22 with the pre-installed tubes 34 is lowered onto the monopile 7. The tubes 34 shown in FIGS. 1 and 3 are J-shaped tubes having a first portion 36 extending in the height direction H and a second portion 37 being bent with respect to the first portion 36 to form the J-shape. The tubes 34 are configured for accommodating the pipes 21, as illustrated in FIG. 1. Having the tubes 34 allows to install the pipes 21 by pushing or pulling the pipes 21 through the tubes 34.

Figure 6:
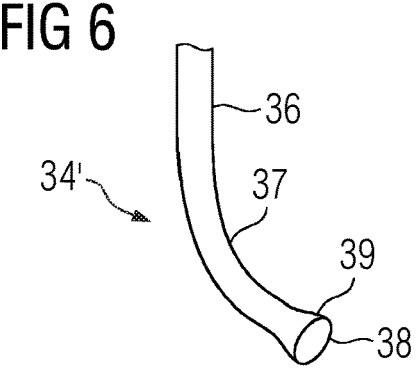
FIG. 6 shows a partial view of a J-shaped tube of the cage of FIG. 3.

As shown in FIG. 6, the tubes 34' may have a bell-shaped mouth 38 at a lower end 39 thereof. The bell-shaped mouth 38 allows to easily insert a respective pipe 21 into the tube 34'.

As shown in FIG. 3, each tube 34 may further have a pre-installed messenger wire 40 guided through the respective tube 34 before installation of the cage 22 with the tubes 34 at the monopile 7. The messenger wire 40 is used for pulling the pipe 21 through the tube 34. Furthermore, each tube 34 may have a float seal 42 (FIG. 3) sealing an opening 43 (e.g., the bell-shaped mouth 38, FIG. 6) of the respective tube 34 at a lower end 39 thereof. The float seal 42 is configured for preventing water entering the tube 34 before the pipe 21 is inserted into the tube 34. The float seal 42 may be connected to the messenger wire 40, as shown in FIG. 3.

Figure 7:
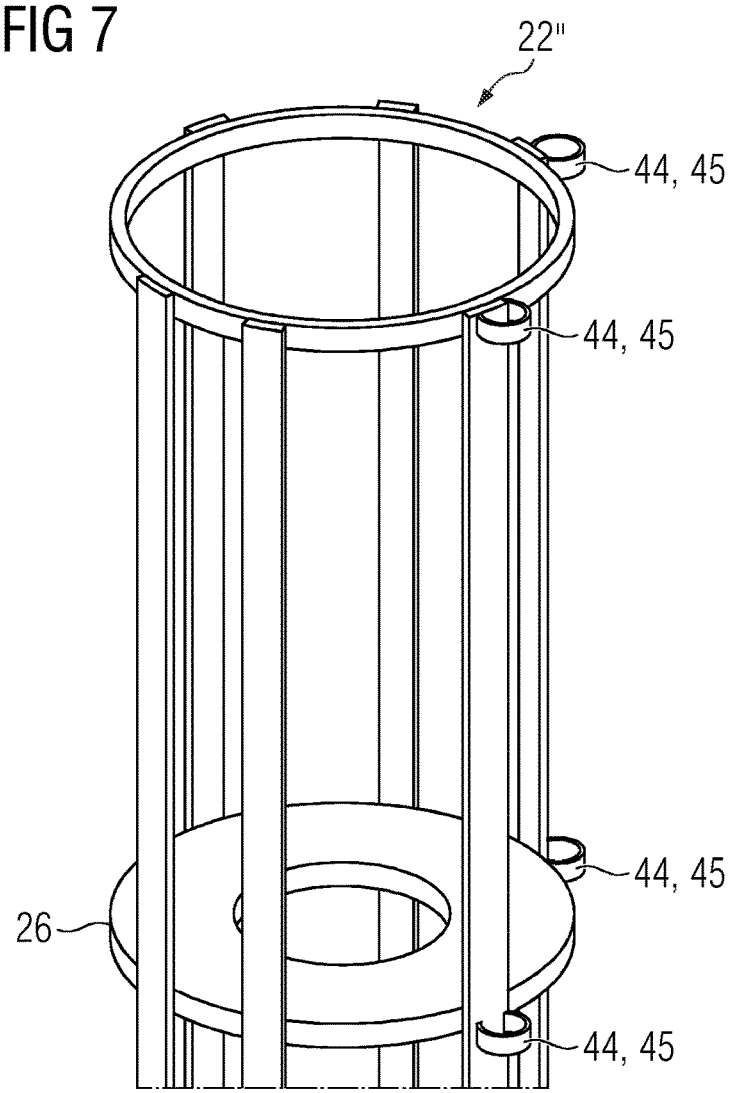
FIG. 7 shows a cage of the wind turbine of FIG. 1 according to a further embodiment, the cage comprising supports including loops for guiding one or more pipes through the loops.

In a further embodiment of the cage 22", the cage 22" comprises instead of tubes (such as the tubes 34) supports 44 for attaching one or more pipes 21 directly at the cage 22", as shown in FIG. 7. For example, each of the one or more supports 44 includes a (e.g., closed) loop 45 for guiding the one or pipes 21 through the respective loop 45.

In embodiments, the cage 22 (FIG. 1) may further comprise in a top portion 46 thereof a landing stage 47 for a vessel.

Using the cage 22, 22', 22" arranged on the monopile 7 of the wind turbine 1, pipes 21 such as energy transportation pipes 21 can be easier installed at the wind turbine 1.

In the example of FIG. 1, the cage 22 is arranged on the monopile 7. In other examples, the cage 22, 22', 22" may also be arranged on a transition piece 48 (FIG. 2) extending in a height direction H'. The transition piece 48 comprises a conically shaped section 49 tapered in the height direction H', as indicated in FIG. 2. Further, the conically shaped section 49 has a conically shaped outer surface 50. The transition piece 48 may be installed on a foundation driven into the seabed such as a monopile or a floating foundation (not shown).

Figure 8:
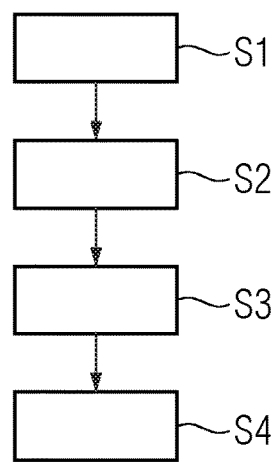
FIG. 8 shows a flowchart illustrating a method for installing a tower of the wind turbine of FIG. 1.

In the following, a method for installing a tower 6 of an offshore wind turbine 1 is described with respect to FIG. 8.

In a first step S1 of the method, a monopile 7 is erected at a seabed 8 such that the monopile 7 is extending in a height direction H. The monopile 7 has a conically shaped outer surface 15 tapered in the height direction H.

In a second step S2 of the method, a cage 22, 22', 22" is lowered onto the erected monopile 7. The cage 22, 22', 22" extends in the height direction H and comprises one or more supports 35, 44 for holding one or more pipes 21 and/or tubes 34. Furthermore, the cage 22, 22', 22" comprises a first inner diameter E1 at a lower portion 29 thereof and a second inner diameter E2 at an upper portion 30, 30' thereof. The second inner diameter E2 is smaller than the first inner diameter E1.

In a third step S3 of the method, the cage 22, 22', 22" is arranged at the monopile 7 such that the upper portion 30, 30' of the cage 22, 22', 22" rests at the conically shaped outer surface 15 of the monopile 7.

In a fourth step S4 of the method, pipes 21 are installed at the cage 22, 22', 22". The pipes 21 are directly attached at the cage 22", e.g., by inserting a respective pipe 21 through loops 45 of supports 44 of the cage 22 (FIG. 7). Alternatively, the cage 22 comprises tubes 34 (FIG. 3), e.g., J-shaped tubes 34, and the pipes 21 are inserted into the tubes 34 (FIG. 1). The pipes 21 are, for example, pulled or pushed through the tubes 34.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A cage for a monopile of an offshore wind turbine, configured to extend, in an installed state, in a height direction of the monopile, wherein the cage comprises:
   one or more supports for holding one or more pipes and/or tubes, and a first inner diameter at a lower portion thereof and a second inner diameter at an upper portion thereof, the second inner diameter being smaller than the first inner diameter;
   wherein the cage is configured to be arranged on the monopile having a conically shaped outer surface tapered in the height direction such that the upper portion of the cage rests at the conically shaped outer surface of the monopile;
   wherein the lower portion is connected to the upper portion by at least one rod.

2. The cage according to claim 1, further comprising one or more tubes connected to the one or more supports and extending in the height direction, the one or more tubes being configured for accommodating one or more pipes.

3. The cage according to claim 2, wherein the one or more tubes are J-shaped tubes with a bell-shaped mouth at a lower end thereof, and comprise inside a pre-installed messenger wire and/or comprise a float seal sealing an opening of the respective tube at the lower end thereof.

4. The cage according to claim 1, wherein the one or more supports each include a loop for guiding one or pipes through the respective loop.

5. The cage according to claim 1, further comprising one or more flexible elements configured for being arranged between the conically shaped outer surface of the monopile and an inner surface of the upper portion of the cage.

6. The cage according to claim 5, wherein the one or more flexible elements comprise rubber, neoprene, nylon, polymer, a fabric, a mat and/or a non-corrosive material.

7. The cage according to claim 1, further comprising in a top portion thereof a landing stage for a vessel.

8. The cage according to claim 1, further comprising at least two tubes separated from each other by a predetermined angle as seen in the height direction.

9. The cage according to claim 1, further comprising a plurality of rods extending in the height direction and one or more rings connected with each other via the plurality of rods, wherein the one or more rings are releasably closed rings.

10. The cage according to claim 1, wherein the cage extends in the height direction of the monopile such that the one or more pipes and/or tubes are guided alongside the monopile from a platform and/or a device of the wind turbine to a seabed.

11. A tower for an offshore wind turbine, comprising a monopile with a conically shaped outer surface and the cage according to claim 1, wherein the cage is arranged on the monopile such that the upper portion of the cage rests at the conically shaped outer surface of the monopile.

12. The tower according to claim 11, wherein the conically shaped outer surface is tapered in the height direction from a first outer diameter to a second outer diameter of the monopile, the first inner diameter of the cage is larger than the first outer diameter, and the second inner diameter of the cage is smaller than the first outer diameter and larger than the second outer diameter.

13. The tower according to claim 11, comprising a gas producing facility and one or more pipes fluidly connected with a gas producing unit of the gas producing facility, wherein the one or more pipes are configured for transporting a gas produced in the gas producing unit to another offshore and/or onshore installation, and the one or more pipes are attached by the supports to the cage or the one or more pipes are guided through one or more tubes of the cage.

14. An offshore wind turbine comprising a tower according to claim 11.

15. A cage for a transition piece of an offshore wind turbine, configured to extend, in an installed state, in a height direction of the transition piece, wherein the cage comprises:
one or more supports for holding one or more pipes and/or tubes, and a first inner diameter at a lower portion thereof and a second inner diameter at an upper portion thereof, the second inner diameter being smaller than the first inner diameter;
wherein the cage is configured to be arranged on the transition piece having a conically shaped outer surface tapered in the height direction such that the upper portion of the cage rests at the conically shaped outer surface of the transition piece;
wherein the lower portion is connected to the upper portion by at least one rod.

16. A tower for an offshore wind turbine, comprising a transition piece with a conically shaped outer surface, and the cage according to claim 15, wherein the cage is arranged on the transition piece such that the upper portion of the cage rests at the conically shaped outer surface of the transition piece.

17. The tower according to claim 16, wherein the conically shaped outer surface is tapered in the height direction from a first outer diameter to a second outer diameter of the transition piece, the first inner diameter of the cage is larger than the first outer diameter, and the second inner diameter of the cage is smaller than the first outer diameter and larger than the second outer diameter.

18. The tower according to claim 16, comprising a gas producing facility and one or more pipes fluidly connected with a gas producing unit of the gas producing facility, wherein the one or more pipes are configured for transporting a gas produced in the gas producing unit to another offshore and/or onshore installation, and the one or more pipes are attached by the supports to the cage or the one or more pipes are guided through one or more tubes of the cage.

19. An offshore wind turbine comprising a tower according to claim 16.

20. A method for installing a tower of an offshore wind turbine, the tower comprising a monopile or a transition piece and a cage, the monopile or transition piece having a conically shaped outer surface tapered in a height direction of the monopile or transition piece in an erected state, the cage extending in the height direction and comprising one or more supports for holding one or more pipes and/or tubes and a first inner diameter at a lower portion thereof and a second inner diameter at an upper portion thereof, the second inner diameter being smaller than the first inner diameter, wherein the lower portion is connected to the upper portion by at least one rod, the method comprising:
lowering the cage onto the erected monopile or transition piece; and
arranging the cage on the monopile or transition piece such that the upper portion of the cage rests at the conically shaped outer surface of the monopile or transition piece.

\* \* \* \* \*